United States Patent [19]

Nakamura et al.

[11] Patent Number: 4,807,993

[45] Date of Patent: Feb. 28, 1989

[54] METHOD AND APPARATUS FOR MEASURING LIGHT BY FREQUENCY MODULATION USING A TIME-VARIABLE SYNCHRONOUS RECTIFICATION SIGNAL

[75] Inventors: Kenji Nakamura, Osaka; Yasutaka Tokuhara, Kyoto, both of Japan

[73] Assignee: Shimadzu Corporation, Japan

[21] Appl. No.: 932,025

[22] Filed: Nov. 18, 1986

[30] Foreign Application Priority Data

Nov. 19, 1985 [JP] Japan .............................. 60-259214

[51] Int. Cl.⁴ .............................................. G01J 3/42
[52] U.S. Cl. .................................... 356/323; 356/325
[58] Field of Search ............... 356/319, 323, 325, 434, 356/447

[56] References Cited

U.S. PATENT DOCUMENTS

| | | | |
|---|---|---|---|
| 3,345,907 | 10/1967 | Wada | 356/323 |
| 3,993,901 | 11/1976 | Widmer | 356/323 X |
| 4,171,913 | 10/1979 | Wildy et al. | 356/325 |
| 4,248,536 | 2/1981 | Hijikata | 356/434 X |
| 4,577,106 | 3/1986 | Fukasawa et al. | 356/323 X |
| 4,583,853 | 4/1986 | Maeda et al. | 356/323 |

Primary Examiner—Gene Wan
Attorney, Agent, or Firm—Franklin D. Wolffe; Morris Fidelman

[57] ABSTRACT

Method and apparatus for measuring light by frequency-modulating a light signal from a sample being measured and demodulating the modulated signal in synchronism with the modulating operation, wherein there is provided a delay circuit which produces a series of pulses for synchronous rectification of the modulated signal in response to and with a predetermined time delay after the modulating operation, so that before measurement of a specific sample the delay time is changed so as to determine the phase of the synchronous rectification pulses most suitable for measurement of the specific sample.

15 Claims, 5 Drawing Sheets

METHOD AND APPARATUS FOR MEASURING LIGHT BY FREQUENCY MODULATION USING A TIME-VARIABLE SYNCHRONOUS RECTIFICATION SIGNAL

BACKGROUND OF THE INVENTION

This invention relates to a method and apparatus for measuring a light signal by frequency modulation, and more particularly to a method and apparatus for synchronously measuring the light signal in a spectrophotometer covering the ultraviolet and visible or the infrared wavelength range by frequency-discriminating the signal modulated to a certain frequency and demodulating the modulated signal in synchronism with the modulating operation.

In order to modulate the light signal from a cell, spectrophotometers are provided with a device such as a rotating chopper for alternately intercepting and passing the light beam from the cell. If the light beam to be chopped has such a large sectional area that cannot be neglected as compared with the mechanical dimension of the chopper, as the size of the light beam and its relative position to the chopper change with samples, the optimum phase of the signal for synchronous rectification changes.

The signal for synchronous rectification is obtained by detecting the rotation of the chopper by means of a detector such as a photocoupler, and the phase of the synchronous rectification signal is adjusted by mechanically adjusting the position of the photocoupler relative to the chopper.

Suppose that a light beam defined by a relatively large sample has a cross-sectional area and a position relative to a chopper 2 as shown at 4 in FIG. 4, and that a light beam defined by a relatively small sample has a cross-sectional area and a position relative to the chopper as shown at 6 in FIG. 4. If the signal for synchronous rectification has an optimum phase for the light beam 4 as shown at A in FIG. 5, a signal as shown at B in FIG. 5 is obtained upon synchronous rectification of the signal caused by the light beam 4 with the synchronous rectification signal A. If the signal caused by the light beam 6 is rectified with the same synchronous rectification signal A, however, a rectified signal as shown at C in FIG. 5 is obtained. The signal C is detected as an apparently smaller signal, with resulting deterioration of the signal-to-noise (S/N) ratio provided that the noise caused by the detector and other elements remains unchanged.

In the prior art arrangement, as the position of the detector such as a photocoupler for detecting the rotation of the modulating means or the rotating chopper is fixed after adjustment of the detector, the phase of the synchronous rectification signal is also fixed, so that it is impossible to readjust the phase of the synchronous rectification signal when the light beam has changed as shown in FIG. 4.

SUMMARY OF THE INVENTION

Accordingly, the primary object of the invention is to provide a method and apparatus for optimizing the phase of the synchronous rectification signal before measurement of a sample is conducted when the light beam to be measured has changed in dimension and/or position.

Briefly stated, the method of the invention comprises: (a) chopping a light beam to be measured by means of a rotating chopper; (b) detecting the chopped light beam to produce a corresponding frequency-modulated electrical signal; (c) providing a first series of pulses in synchronism with said chopping of said light beam; (d) providing a second series of pulses in response to and with a predetermined time delay after said first series of pulses; (e) changing said delay time to determine the phase of said second series of pulses most suitable for a specific sample to be measured; and (f) rectifying said frequency-modulated electrical signal in synchronism with said second series of pulses whose phase has been determined so as to produce a demodulated electrical signal.

The apparatus of the invention comprises: (a) a chopper for chopping a light beam to be measured; (b) a photodetector for detecting said chopped light beam to produce a corresponding frequency-modulated electrical signal; (c) means for detecting the rotation of said chopper to provide a first series of pulses in synchronism with the chopping operation of said chopper; (d) a delay circuit for receiving said first series of pulses and producing a second series of pulses after a predetermined time delay; (e) a synchronous rectifier for rectifying said frequency-modulated signal in synchronism with said second series of pulses to produce a demodulated electrical signal; and (f) a central processor for changing said delay time so as to determine a delay time which causes said demodulated electrical signal to become highest, and causing said determined delay time to be set in said delay circuit.

DESCRIPTION OF PREFERRED EMBODIMENTS

Figure 1:
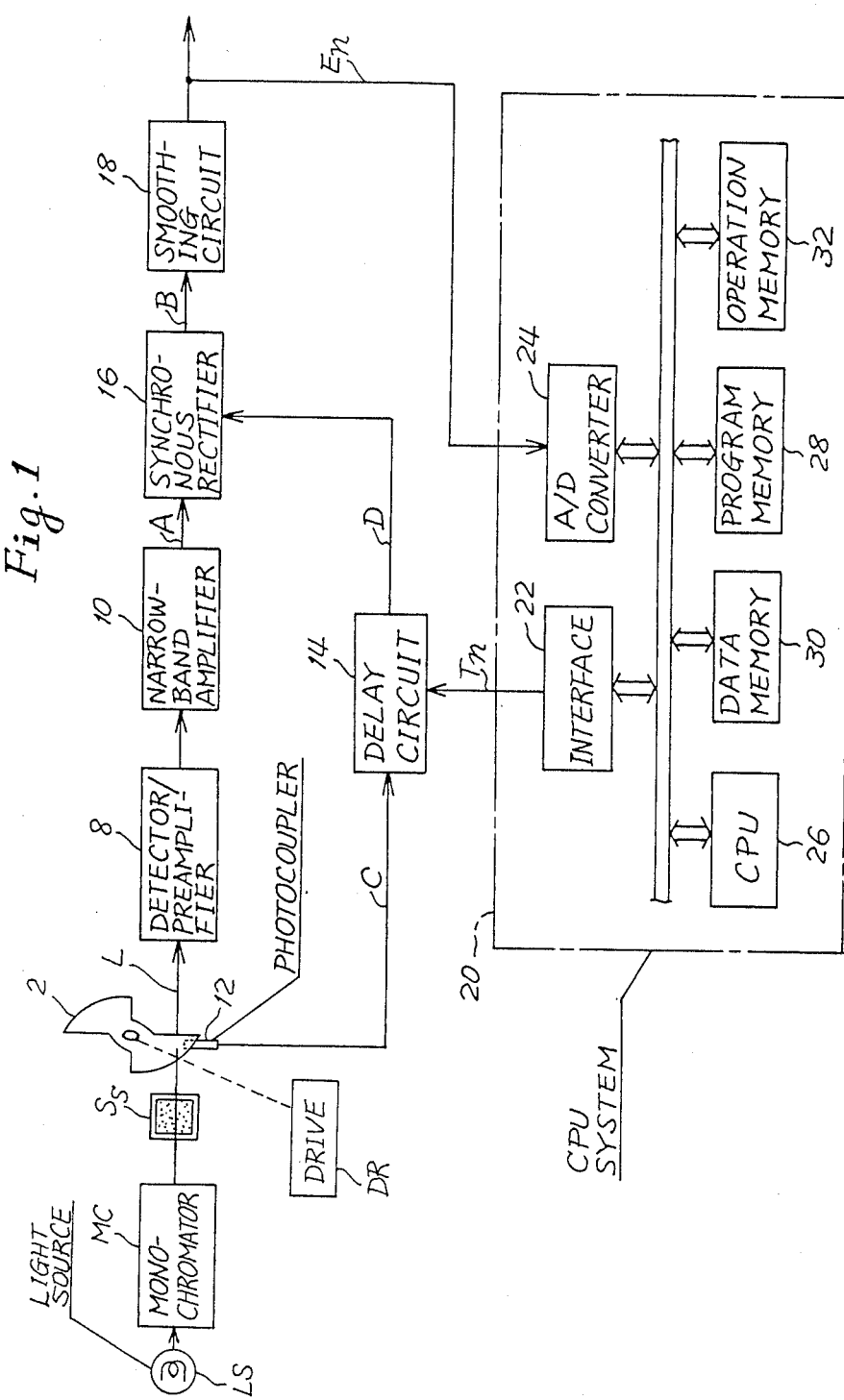
FIG. 1 is a block diagram of a single-beam spectrophotometer constructed in accordance with the invention.

FIG. 1 shows a schematic diagram of a single-beam spectrophotometer to which the concept of the present invention is applied. There is shown a light source LS, the light from which enters a monochromator MC including a dispersing element not shown. The monochromatic light from the monochromator is passed through a cell $S_S$ containing a sample to be measured. A chopper 2 driven by a drive DR chops or modulates the light beam coming from the cell $S_S$. The modulated light signal L is detected by a detector/preamplifier 8, the amplified signal from which is applied to a narrow-band amplifier 10 tuned to the modulation frequency. The amplifier 10 amplifies a selected band of the signal to produce a signal A shown in FIG. 2 in the form of a sine wave with an improved S/N ratio.

Figure 2:
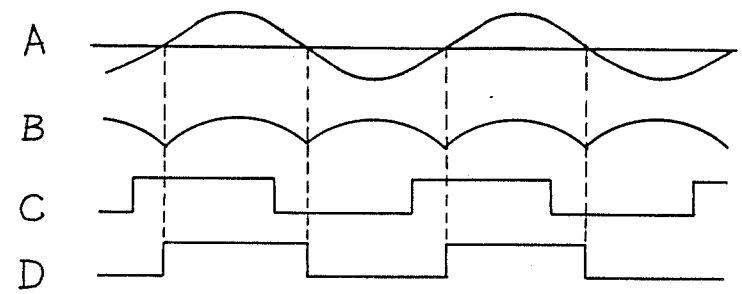
FIG. 2 shows the waveforms of the signals at different parts of the apparatus of FIG. 1.

A photocoupler 12 detects the rotation of the chopper 2 to produce a pulse signal C shown in FIG. 2. The signal C is applied to a delay circuit 14, which produces a pulse signal D for synchronous rectification after a predetermined delay T. In response to the signal D, a synchronous rectifier 16 rectifies the signal A from the amplifier 10 in synchronism with the operation of the rotating chopper 2 so as to produce a signal B, which is taken out through a smoothing circuit 18.

A CPU system 20 applies through an interface 22 a succession of signals $T_n$ to the delay circuit 14 to set therein different delay times successively, and receives through an analog-to-digital converter 24 the output $E_n$ of the smoothing circuit 18 upon lapse of each of the delay times, and determines the delay time which causes the output $E_n$ to become highest. To enable such determination, the system 20 comprises, in addition to the interface 22 and the converter 24, a central processing unit (CPU) 26, a program memory 28, a data memory 30 for storing the value of the output $E_n$ of the smoothing circuit 18 for each of the delay times, and an operation memory 32 for storing the parameters N, $T_n$ and X to be described hereinafter.

Figure 3:
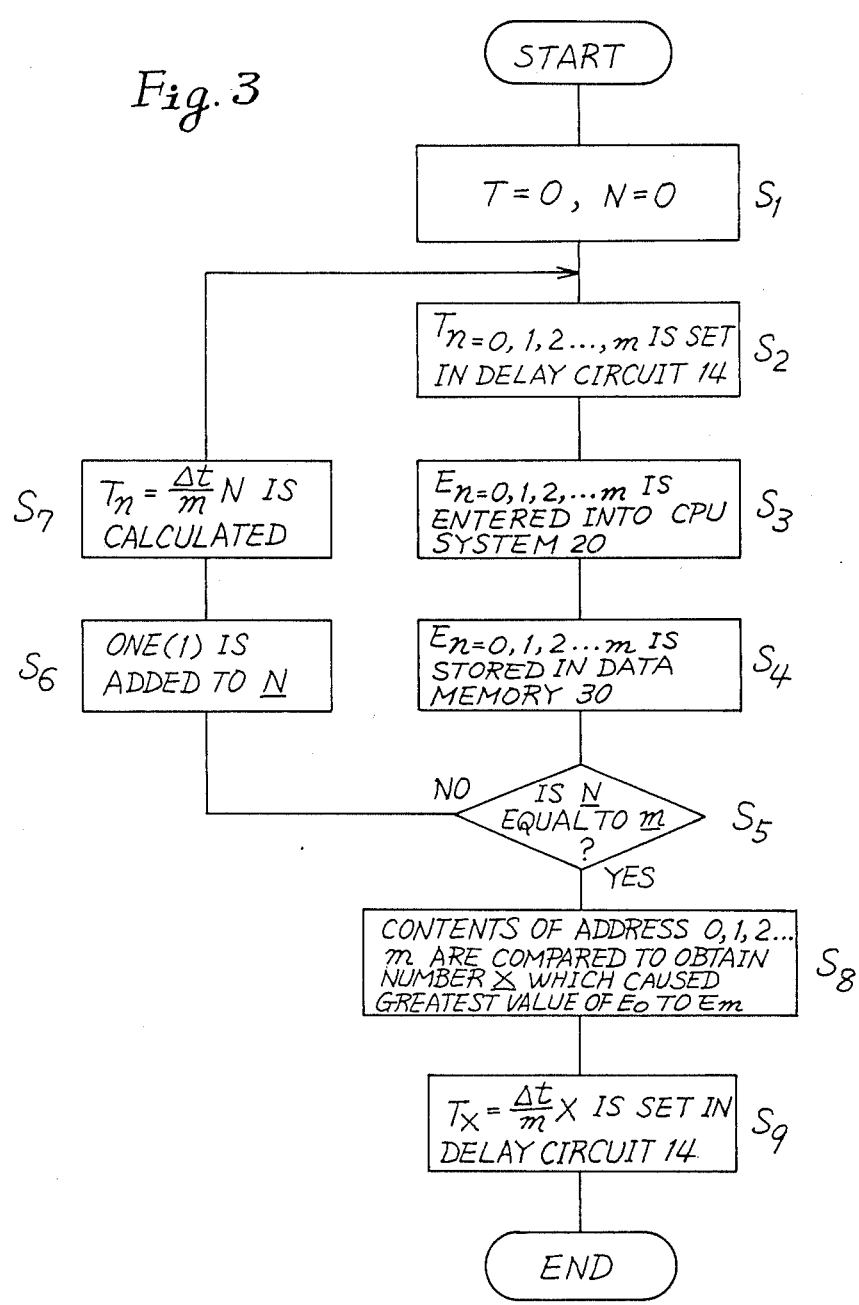
FIG. 3 is a flow chart showing by way of example the steps taken in the method of the invention for determining the optimum delay time for the synchronous rectification signal.
Figure 4:
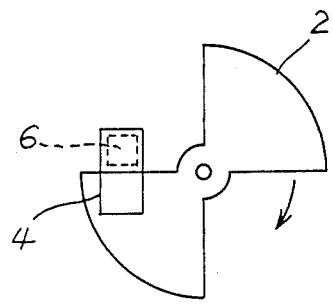
FIG. 4 is a front view schematically showing a rotary chopper and a light beam to be chopped by the chopper.
Figure 5:
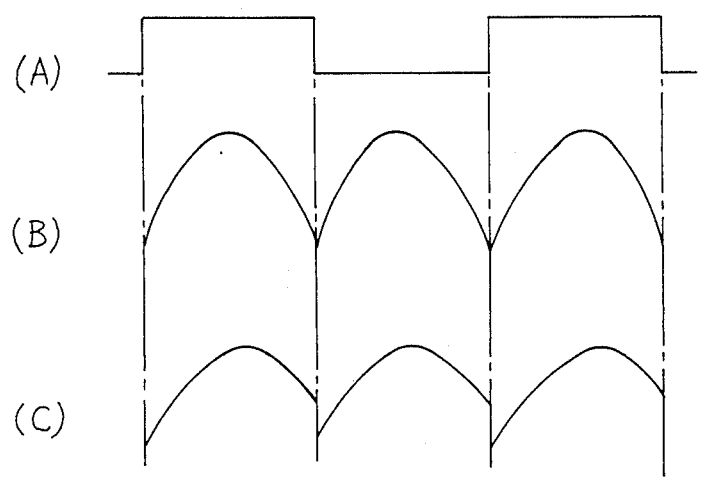
FIG. 5 shows the waveform of the signal for synchronous rectification and those of the signals obtained by synchronous rectification of different modulated waves.

Referring now to FIG. 3, a procedure for determining the optimum delay time will be explained.

Initially, at step $S_1$ the delay time $T_n$ and the number N of times the delay time $T_n$ is changed are both set to zero.

At step $S_2$ the system 20 applies to the delay circuit 14 a signal corresponding to the delay time $T_o$ having been set to zero, and at step $S_3$ receives from the smoothing circuit 18 the output $E_o$, which is stored in address No. 0 of the data memory 30 at step $S_4$. Then at step $S_6$ one (1) is added to the number N, and at step $S_7$ the next delay time $T_1$ is calculated according to the expression $$T_n = (\Delta t/m)N$$

wherein $\Delta t$ is the set greatest value of the delay time, and m is the set greatest number N of times the delay time $T_n$ is to be changed.

With the new delay time $T_1$, steps $S_2$ to $S_4$ are taken so that the output $E_1$ is stored in address No. 1 of the data memory 30.

In this manner, with successively changed delay times $T_2$, $T_3$ ... $T_m$ steps $S_2$ to $S_7$ are repeated to store successive data $E_2$, $E_3$, ... $E_m$ in the respective address Nos. 2, 3, ... m in the data memory 30.

When N becomes m, that is, N=m, at step $S_8$ the data $E_o$ to $E_m$ stored in the memory 30 are compared with each other so as to obtain the number N which has caused the highest value of the data $E_o$ to $E_m$. The number N is referred to as X.

The delay time $T_x$ obtained by the expression $$T_x = (\Delta t/m)X$$

causes the output $E_x$ from the smoothing circuit 18 to become highest, and is the most suitable for synchronous rectification of the signal then being measured.

The delay time $T_x = (\Delta t/m)X$ is then set in the delay circuit 14 at step $S_9$, so that measurement of a sample is conducted.

Figure 6:
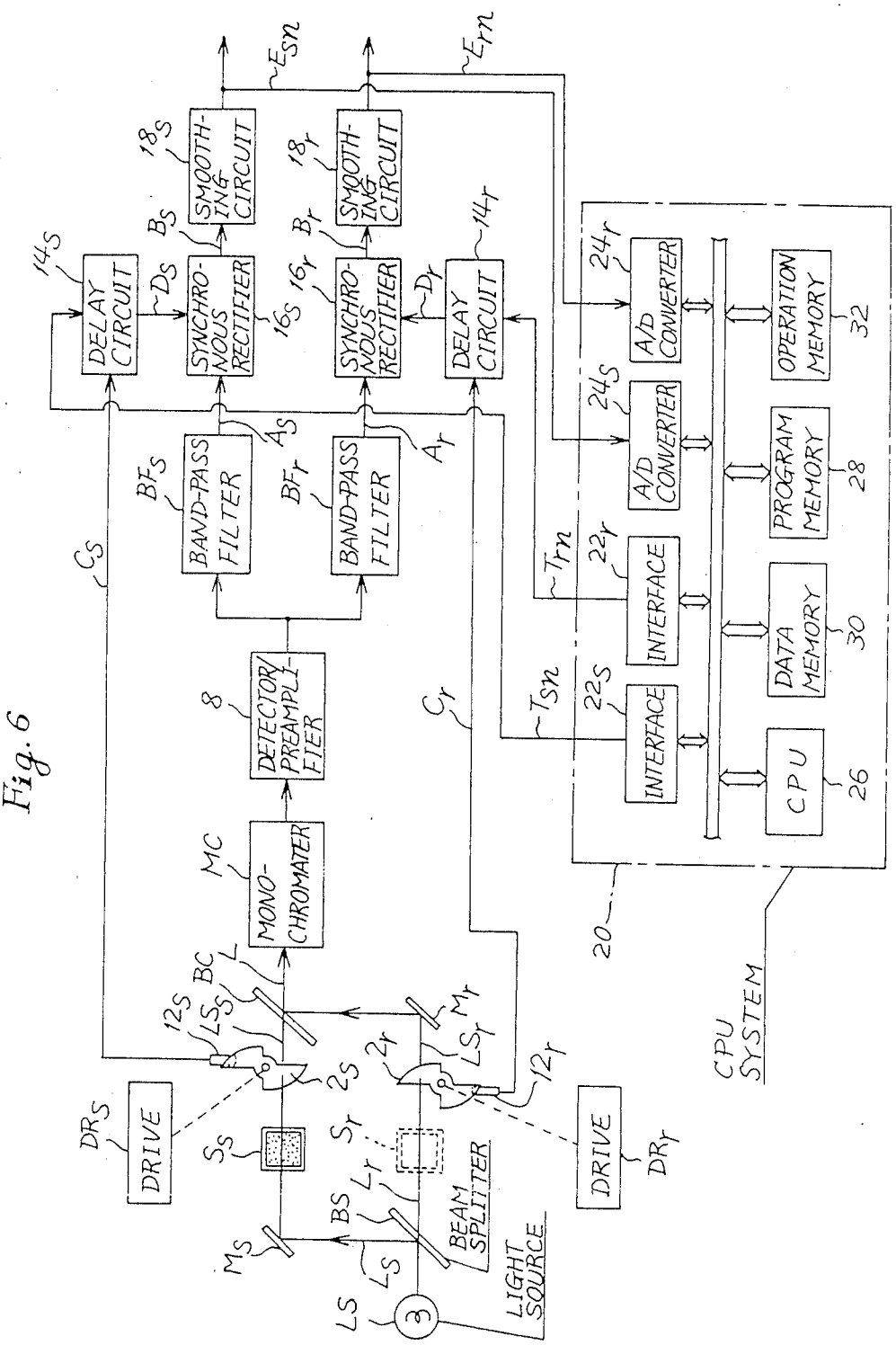
FIG. 6 is a block diagram of a double-beam spectrophotometer constructed in accordance with the invention.

FIG. 6 shows a schematic diagram of a double-beam spectrophotometer to which the concept of the present invention is applied. The same reference symbols as in FIG. 1 designate corresponding component parts so that no explanation will be given to them except when necessary. In FIG. 6 the suffixes s and r to the reference symbols indicate that the component parts designated by the symbols with the suffixes are associated with the sample and the reference, respectively.

The light from the source LS is split by a beam splitter BS into sample and reference beams $L_r$ and $L_s$. The sample beam $L_s$ is reflected by a plane mirror $M_s$ and passed through a sample cell $S_s$ containing a sample material to be measured. A first chopper $2_s$ rotated by a drive $DR_s$ chops the light from the sample to produce a modulated light signal $LS_s$ having a first frequency $f_s$ as determined by the rotational speed of the chopper $2_s$. The modulated light signal $LS_s$ advances toward a beam combiner BC.

The reference beam $L_r$ is passed through a reference cell $S_r$ containing a reference material. (The reference cell may be omitted.) A second chopper $2_r$ rotated by a drive $DR_r$ chops the light from the reference to produce a modulated light signal $LS_r$ having a second frequency $f_r$ different from the first frequency $f_s$ as determined by the rotational speed of the second chopper $2_r$. The modulated light signal $LS_r$ is reflected by a plane mirror $M_r$ and combined by the beam combiner BC with the sample light signal $LS_s$ into a single beam L, which is introduced into a monochromator MC, the monochromatic light from which is applied to a detector/preamplifier 8, which produces a corresponding frequency-modulated electrical signal comprising two components having the first and second frequencies $f_s$ and $f_r$, respectively. The two components are separated by two band-pass filters $BF_s$ and $BF_r$ which pass frequencies $f_s$ and $f_r$, respectively.

The rotation of the choppers $2_s$ and $2_r$ is detected by photocouplers $12_s$ and $12_r$, respectively, which produce pulse signals $C_s$ and $C_r$ to be applied to the delay circuits $14_s$ and $14_r$, respectively, which produce pulse signals $D_s$ and $D_r$ after a predetermined time delay $T_s$, $T_r$. In response to the signals $D_s$ and $D_r$ the synchronous rectifiers $16_s$ and $16_r$ rectify the outputs $A_s$ and $A_r$ from the filters $BF_s$ and $BF_r$ in synchronism with the rotation of the choppers $2_s$ and $2_r$ so as to produce outputs $B_s$ and $B_r$, respectively, which are taken out through smoothing circuits $18_s$ and $18_r$, respectively.

A CPU system 20 applies through an interface $22_s$ a succession of signals $T_{sn}$ to the delay circuit $14_s$ to set therein different delay times and through an interface $22_r$ a succession of signals $T_{rn}$ to the other delay circuit $14_r$ to set therein different delay times. On the other hand, upon lapse of each of the delay times the system 20 receives through an analog-to-digital converter $24_s$ the output $E_{sn}$ of the smoothing circuit $18_s$ and through an analog-to-digital converter $24_r$ the output $E_{rn}$ of the smoothing circuit $18_r$, and determines the delay times which cause the outputs $E_{sn}$ and $E_{sn}$ to become highest in a manner similar to that described with reference to FIG. 1. The delay times thus determined are set in the delay circuits $14_s$ and $14_r$, respectively, for measurement of a sample.

The monochromator MC may be disposed between the light source LS and the beam splitter BS instead of being disposed between the beam combiner BC and the detector/preamplifier 8 as in FIG. 6.

In accordance with the invention, since the optimum phase of the synchronous rectification signal is determined prior to measurement by changing the delay time of the signal, the optimum condition can be selected for measuring a specific sample. It is also possible to automatically select the phase of the synchronous rectification signal most suitable for the measuring conditions.

What we claim is:

1. A method of measuring light by frequency modulation, comprising:
    (a) chopping a light beam to be measured by means of a rotating chopper;
    (b) detecting the chopped light beam to produce a corresponding frequency-modulated electrical signal;
    (c) providing a first series of pulses in synchronism with said chopping of said light beam;
    (d) providing a second series of pulses in response to and with a time delay after said first series of pulses;
    (e) changing said delay time to determine the phase of said second series of pulses most suitable for a specific sample to be measured; and
    (f) rectifying said frequency-modulated electrical signal in response to said second series of pulses whose phase has been determined to produce a demodulated electrical signal.

2. The method of claim 1, further including the step of
    (b') frequency-discriminating said frequency-modulated electrical signal to produce a signal of a predetermined narrow frequency band.

3. The method of claim 1, further including the step of
    (g) smoothing said demodulated signal to produce a corresponding output.

4. Apparatus for measuring light by frequency modulation, comprising:
    (a) a chopper for chopping a light beam to be measured;
    (b) a photodetector for detecting said chopped light beam to produce a corresponding frequency-modulated electrical signal;
    (c) means for detecting the rotation of said chopper to provide a first series of pulses in synchronism with the chopping operation of said chopper;
    (d) a delay circuit for receiving said first series of pulses and producing a second series of pulses after a predetermined time delay;
    (e) a synchronous rectifier for rectifying said frequency-modulated signal in response to said second series of pulses to produce a demodulated electrical signal; and
    (f) means for changing said delay time to be set in said delay circuit so as to determine a delay time which causes said demodulated electrical signal to become highest, and causing said determined delay time to be set in said delay circuit.

5. The apparatus of claim 4, further including a narrow-band amplifier connected between said detector and said synchronous rectifier.

6. The apparatus of claim 5, further including a smoothing circuit for smoothing said demodulated electrical signal.

7. The apparatus of claim 4, further including a smoothing circuit for smoothing said demodulated electrical signal.

8. The apparatus of claim 4, wherein said detecting means comprises a photocoupler.

9. A spectrophotometer comprising:
    (a—1) a cell for containing a sample to be measured;
    (a—2) means for producing a beam of monochromatic light to be passed through said sample;
    (a—3) a chopper for chopping the light emerging from said sample;
    (b) a photodetector for detecting said chopped light beam to produce a corresponding frequency-modulated electrical signal;
    (c) means for detecting the rotation of said chopper to provide a first series of pulses in synchronism with the chopping operation of said chopper;
    (d) a delay circuit for receiving said first series of pulses and producing a second series of pulses after a predetermined time delay;
    (e) a synchronous rectifier for rectifying said frequency-modulated signal in response to said second series of pulses to produce a demodulated electrical signal; and
    (f) means for changing said delay time so as to determine a delay time which causes said demodulated electrical signal to become highest, and causing said determined delay time to be set in said delay circuit.

10. The spectrophotometer of claim 9, further including a narrow-band amplifier connected between said detector and said synchronous rectifier.

11. The spectrophotometer of claim 10, further including a smoothing circuit for smoothing said demodulated electrical signal.

12. A spectrophotometer comprising:
    (a) means for providing a first and a second light beam;
    (b) a cell containing a sample to be measured and disposed in the path of one of said light beams;
    (c) a first chopper for chopping said first light beam to produce a first modulated light signal having a first frequency;
    (c') a second chopper for chopping said second light beam to produce a second modulated light signal having a second frequency;
    (d') means for combining said first and second modulated light signals into a single beam;
    (e) means for rendering said light beam monochromatic;
    (f) a photodetector for detecting said light beam to produce a corresponding frequency-modulated electrical signal comprising a first component of said first frequency and a second component of said second frequency;
    (g) means for separating said first and second components of said frequency-modulated signal;
    (h) means for producing a first series of pulses of said first frequency in synchronism with said first modulated light signal of said first frequency;
    (h') means for producing a first series of pulses of said second frequency in synchronism with said second modulated light signal of said second frequency;
    (i) a first delay circuit for receiving said first series of pulses of said first frequency to produce a second series of pulses of said first frequency after a predetermined first time delay;
    (i') a second delay circuit for receiving said first series of pulses of said second frequency to produce a second series of pulses of said second frequency after a predetermined second time delay;
    (j) a first synchronous rectifier for rectifying said separated first component of said frequency-modulated electrical signal in response to said second series of pulses of said first frequency to produce a first demodulated electrical signal;

(j') a second synchronous rectifier for rectifying said separated second component of said frequency-modulated electrical signal in response to said second series of pulses of said second frequency to produce a second demodulated electrical signal; and (k) means for changing said first and second delay times so as to determine a first and a second delay time which cause said first and second demodulated electrical signals, respectively, to become of the highest level, and causing said determined first and second delay times to be set in said first and second delay circuits, respectively.

13. The spectrophotometer of claim 12, further including a first and second smoothing circuit for smoothing said first and second demodulated electrical signals, respectively.

14. The spectrophotometer of claim 12, wherein said means for producing a first series of pulses of said first frequency and said means for producing a first series of pulses of said second frequency are photocouplers for detecting the rotation of said first and second choppers, respectively.

15. The spectrophotometer of claim 12, further including a second cell for containing a reference material.

* * * * *